May 15, 1956 R. H. KRAFT 2,745,652
MINING MACHINE HAVING COMBINED ELEVATING CONVEYOR
AND HORIZONTAL ROTARY CUTTER BAR
Filed Oct. 22, 1954 3 Sheets-Sheet 1

INVENTOR.
Robert H. Kraft
BY
Murray A. Gleeson
ATTORNEY

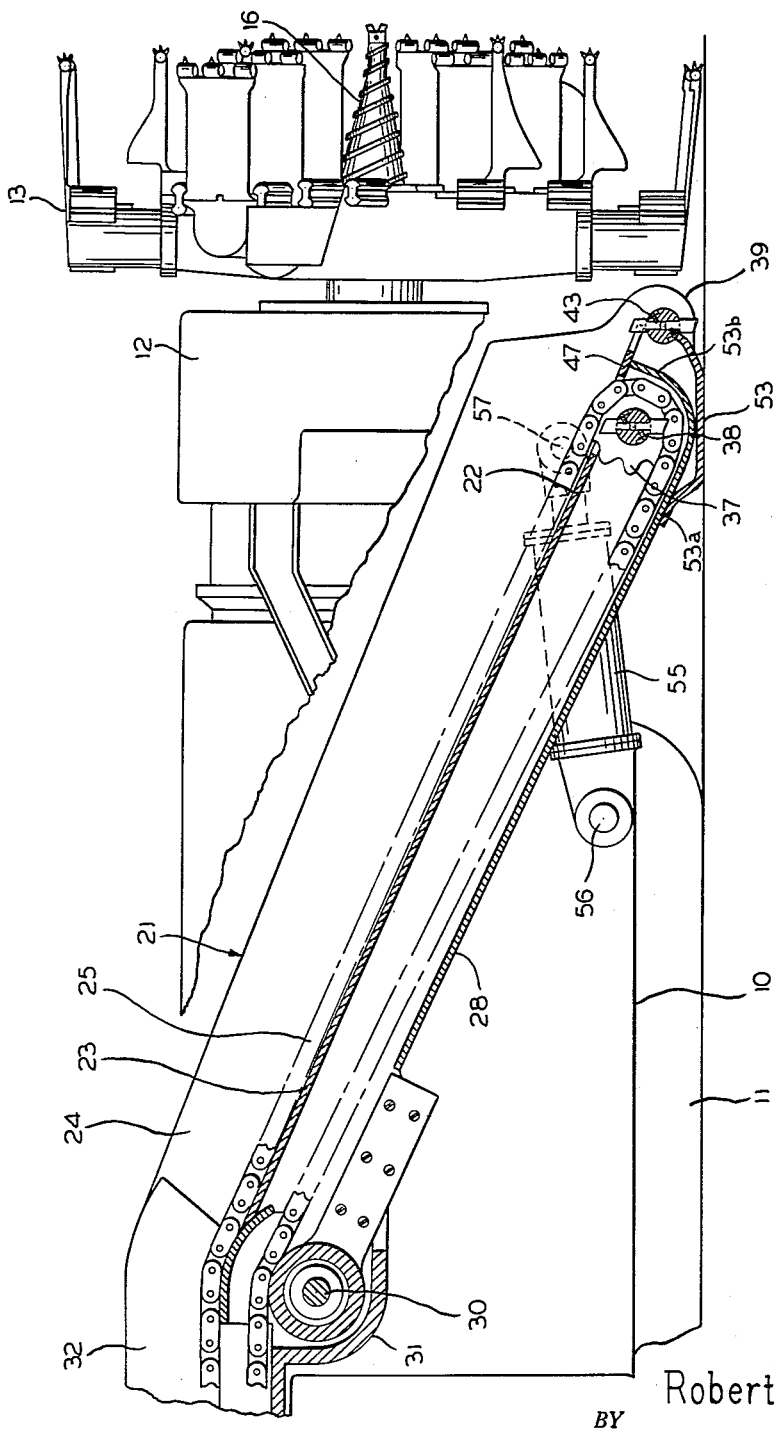

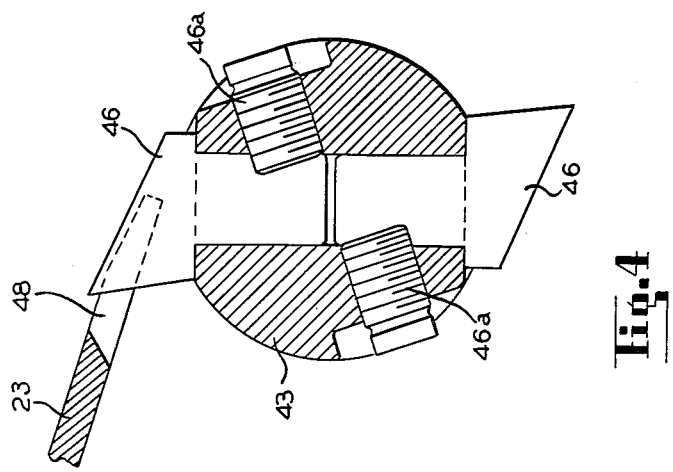
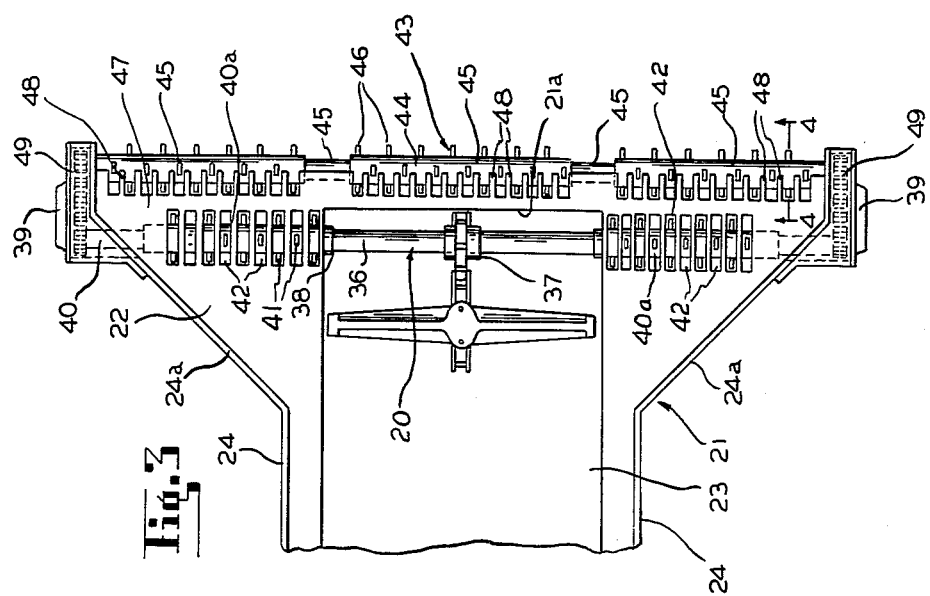
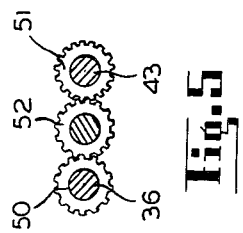
INVENTOR.
Robert H. Kraft
BY Murray G. Gleeson
ATTORNEY

United States Patent Office 2,745,652
Patented May 15, 1956

2,745,652

MINING MACHINE HAVING COMBINED ELEVATING CONVEYOR AND HORIZONTAL ROTARY CUTTER BAR

Robert H. Kraft, Chicago, Ill., assignor to Goodman Manufacturing Company, Chicago, Ill., a corporation of Illinois Application October 22, 1954, Serial No. 464,068

2 Claims. (Cl. 262—24)

This invention relates to improvements in multiple boring machines wherein two rotatable boring members are rotatable on parallel spaced axes to cut continuous overlapping bores in advance of the machine. A machine of the general type above described is disclosed in the patent to McKinlay 1,603,621, issued October 19, 1926. Such machines are usually provided with horizontally disposed auxiliary cutting devices, as for instance along the floor of the mine immediately behind the boring heads, to cut off the upstanding cusps left at the floor between the two main bores.

The principal object of the present invention is to provide an improved and simplified form of auxiliary horizontal cutting device along the floor of the mine, incorporated in and forming a part of an elevating conveyor for discharging the cuttings to the rear of the machine.

A further object of the invention is to provide an auxiliary horizontal cutting device which is driven directly from the front end of a chain type conveyor flight forming part of the main conveyor of the machine.

A still further object of the invention is to provide an auxiliary horizontal cutting mechanism of the rotary cutter bar type mounted on and adjustable vertically with the front end of the elevating conveyor at the front end of the machine.

Other objects and advantages of the invention will appear from the time to time as the following description proceeds. The invention may best be understood by reference to the accompanying drawings, in which:

Figure 2 is an enlarged side view in part section of the part of the machine shown in Figure 1.

Figure 3 is an enlarged detailed plan view of the auxiliary horizontal cutter bore mechanism at the front end of the elevating conveyor.

Figure 4 is an enlarged detailed section taken on line 4—4 of Figure 3.

Figure 5 is a diagrammatic view of the gear connections for the two front shafts of the cutting mechanism.

Figure 1:
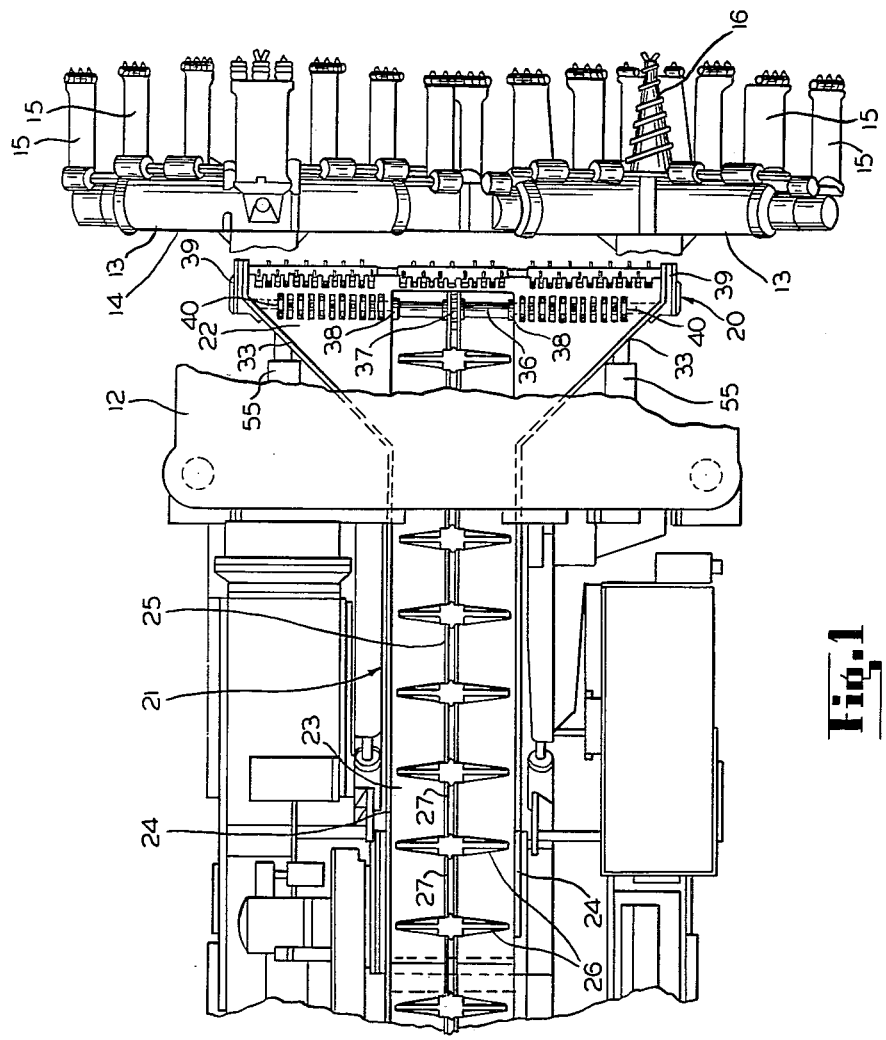
Figure 1 is a fragmentary plan view showing the front end of a mining machine to which my invention has been applied.

Referring now to details of the embodiment of my invention, the same is shown as applied to a mobile mining machine having as its essential elements a main frame 10 mounted on endless treads indicated at 11 and having an auxiliary frame 12 at its front end supporting a pair of laterally spaced boring heads 13, each having a plurality of radially extending arms 14 with cutter supports 15, 15 projecting forwardly therefrom. Each of said cutter heads may also have a burster cone 16 projecting forwardly on the axis thereof. The general form and arrangement of the machine and its boring heads is well known in the art, so further details need not be described herein.

Referring more particularly to the improved form of auxiliary horizontal cutter mechanism to which the present invention is particularly directed, such cutter mechanism is indicated generally at 20 where it is wholly supported along the front edge of the hinged elevating conveyor section indicated generally at 21. As shown in Figures 1 and 2, the conveyor section consists of a relatively wide gathering apron 22 at the front end of a relatively narrow length of conveyor trough formed of a transverse plate 23 and upright side walls 24, 24, along which a chain flight conveyor indicated generally at 25 is movable. The flight conveyor is of conventional center chain type, including a plurality of spaced transverse bars or flights 26 jointed by a flexible chain 27. The conveyor section 21 also has a bottom plate 28 substantially parallel to and spaced below bottom plate 23 for enclosing the return reach of the flight conveyor 25. The widened front apron 22 has diverging side walls 24a connected at their rear ends to the side walls 24 of the trough.

The rear end of the conveyor section 21 is hinged or pivoted at 30 to a bracket 31 on the main frame 10 to permit the front end of the elevating conveyor section to swing vertically with respect to said main frame. The flight conveyor 25 continues rearwardly from the hinged rear end of section 21 through a generally horizontal trough section 32 fixed on and extending rearwardly along the main frame 10 to a point where the material may be discharged onto a suitable transporting device (not shown).

A horizontally disposed shaft 36 is rotatably mounted near the front end of the apron 22 below the top surface of the latter and has a chain sprocket 37 fixed at the center thereof about which the chain 27 of the flight conveyor is trained. The apron 22 has an elongated rectangular opening 21a over the shaft 36 to accommodate the flight conveyor as it passes upwardly about the shaft 36, for movement rearwardly along the upper surface of the apron. The latter shaft is journalled in bearings 38, 38 at opposite sides of the elongated opening 21a below the top surface of the apron.

The shaft 36 has end portions 40 extended to suitable journal bearings in gear housings 39, 39 mounted on the front ends of the flared side wall portions 24a of the apron. In the form shown herein these extended end portions 40 have enlarged cylindrical portions 40a between the bearings 38 and the gear housings 39, which enlarged portions have a plurality of cutter bits 41, 41 projecting radially therefrom so as to extend upwardly through a series of longitudinally disposed slots 42, 42 formed in the apron 22 at opposite sides of the elongated opening 21a. The cutter bits 41 aid in progressing material rearwardly along the apron, as will hereinafter be more fully described.

The principal element of the transverse cutting means 20 mounted on the front end of the hinged conveyor section 21 consists of a rotatable shaft 43 supported transversely along the extreme front edge of the apron 22 with its outer ends journalled in the gear housings 39, and having intermediate enlarged cylindrical portions 44 supported in the bearings 45, 45 dependent from the front edge of the apron 22. The enlarged portions 44 have a plurality of cutter bits 46, 46 detachably mounted therein and secured by set screws 46a, as shown in Figure 4.

As seen in Figure 2, the axis of the shaft 43 is below the upper face of apron 22, and is also slightly below the axis of the sprocket shaft 36. Said apron has a series of forwardly projecting fingers 48, 48 along its front edge extending partly over the shaft 43 and between adjacent cutter bits 46 on the said shaft to aid in gathering loose material on the front edge of the apron.

Gearing is suitably mounted in the housings 39 to connect the two shafts 36 and 43 so as to rotate them in the same direction for moving loose material rearwardly along the apron 22. This gearing may consist of conventional spur gears 50 and 51 fixed on the outer ends of shafts 36 and 43, an intermediate idler gear 52 meshed therewith, as shown in Figure 5.

The front end of the hinged conveyor 21 has a depending skid 53 along the bottom of its widened apron 22 for engaging the ground. In the form shown said skid consists of a plate having a flanged rear edge 53a fixed to the bottom plate 28 and an upwardly curved front edge 53b fixed to the auxiliary plate 47 to provide support for the latter (see Figure 2).

Vertical swinging movement of the hinged conveyor section 21 may be effected by power through a pair of hydraulic cylinder devices 55 having their rear ends pivotally connected at 56 to the front end of the main frame 10 and their front ends pivotally connected at 57 to the flared side plates 33 of the hinged conveyor section 21.

The use and operation is as follows:

During normal cutting operations the two boring heads 13, 13 are advanced into a working face in the usual manner so as to cut contiguous bores. The hydraulic cylinder means 55 is operated to adjust the position of the front end of the hinged conveyor section 22 so that it will be maintained at the desired level at which the rotating cutter bar 43 will remove the upstanding cusp left between the lower limits of the two bores formed by the boring heads 13, thereby forming a generally flat floor surface.

The bits 41 on sprocket shaft 36 will also aid in gathering loose material dislodged from the working face by the boring heads and moving such material rearwardly along the apron 22 to be picked up by the flight conveyor for final discharge at the rear of the machine.

The conveyor section 21 can be elevated by the hydraulic cylinders above the ground level when it is desired to move the machine from place to place in the mine.

As will be observed in Figure 1, the gear housings 39, 39 at opposite sides of the apron 22 are disposed to the rear of the two boring heads 13 in longitudinal alignment with their axes, so as to follow in the paths of the two bores formed by said boring heads.

I claim:

1. In a mining machine having an elongated conveyor structure with a widened apron at its front end and adapted to gather material from the mine floor in advance of the machine for removal toward the rear of the machine, said conveyor structure including a chain flight conveyor, a sprocket shaft journalled on a transverse axis adjacent the front gathering end of the conveyor structure, a cutting mechanism including a rotary cutter bar with projecting cutter bits disposed along the widened front apron of the conveyor structure in advance of said sprocket shaft, driving connections between the sprocket shaft and the rotary cutter bar for driving the latter, the sprocket shaft also having coaxial rotary cutter bar portions at opposite ends thereof with cutter bits projecting therefrom and the widened apron having a plurality of slots in its upper surface permitting the cutter bits on the sprocket shaft to project upwardly through said apron as they are rotated with the sprocket shaft.

2. The structure of claim 1, wherein the apron in advance of the slots has a plurality of laterally spaced, forwardly projecting fingers therealong affording clearance for the cutter bits on the rotary cutter bar along the front of the apron.

References Cited in the file of this patent

UNITED STATES PATENTS

| 1,645,007 | Johansen | Oct. 11, 1927 |
| 2,008,817 | Cartledge | July 23, 1935 |
| 2,531,072 | Merchant | Nov. 21, 1950 |
| 2,694,562 | Snyder et al. | Nov. 16, 1954 |